US012684588B2

(12) United States Patent
Lee et al.

(10) Patent No.: US 12,684,588 B2
(45) Date of Patent: Jul. 14, 2026

(54) METHOD AND APPARATUS FOR TRANSMITTING OR RECEIVING WIRELESS SIGNAL IN WIRELESS COMMUNICATION SYSTEM

(71) Applicant: LG ELECTRONICS INC., Seoul (KR)

(72) Inventors: Youngdae Lee, Seoul (KR); Suckchel Yang, Seoul (KR); Seonwook Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 633 days.

(21) Appl. No.: 18/018,023

(22) PCT Filed: Aug. 4, 2021

(86) PCT No.: PCT/KR2021/010207
§ 371 (c)(1),
(2) Date: Jan. 25, 2023

(87) PCT Pub. No.: WO2022/030985
PCT Pub. Date: Feb. 10, 2022

(65) Prior Publication Data
US 2023/0276458 A1      Aug. 31, 2023

Related U.S. Application Data

(60) Provisional application No. 63/061,776, filed on Aug. 5, 2020.

(51) Int. Cl.
| *H04W 72/232* | (2023.01) |
| *H04L 1/00* | (2006.01) |
| *H04L 1/1812* | (2023.01) |

(52) U.S. Cl.
CPC ......... *H04W 72/232* (2023.01); *H04L 1/0061* (2013.01); *H04L 1/1812* (2013.01)

(58) Field of Classification Search
CPC ... H04W 72/232; H04L 1/0061; H04L 1/1812
See application file for complete search history.

(56) References Cited

U.S. PATENT DOCUMENTS

| 11,968,740 B2 * | 4/2024 | Zhou | ..................... H04B 7/0626 |
| 12,375,219 B2 * | 7/2025 | Lee | ......................... H04L 1/1864 |
| 2021/0068144 A1 * | 3/2021 | Jung | ..................... H04L 5/0053 |

(Continued)

FOREIGN PATENT DOCUMENTS

| CA | 2898097 A1 * | 7/2014 | ............ H04W 72/23 |

*Primary Examiner* — Michael J Moore, Jr.
(74) *Attorney, Agent, or Firm* — LEE, HONG, DEGERMAN, KANG & WAIMEY

(57) ABSTRACT

A terminal according to an embodiment of the present disclosure may: monitor a PDCCH in a search space for a specific multicast service to be received so as to receive downlink control information (DCI) in which a CRC is scrambled by a specific RNTI; repeatedly receive a TB related to the specific multicast service on a multicast frequency part on the basis of the DCI; and transmit, after repetition of the TB, an HARQ-ACK indicating a result of decoding of the TB through a PUCCH resource indicated by the DCI, wherein the specific RNTI is a group-RNTI (G-RNTI) associated with the specific multicast service that the terminal is to receive.

12 Claims, 14 Drawing Sheets

(56)     References Cited

U.S. PATENT DOCUMENTS

| | | | |
|---|---|---|---|
| 2022/0239428 A1* | 7/2022 | Lee | H04L 5/0048 |
| 2023/0028180 A1* | 1/2023 | Lee | H04L 1/1822 |
| 2023/0093727 A1* | 3/2023 | Lin | H04L 1/0061 |
| | | | 370/312 |
| 2023/0163895 A1* | 5/2023 | Lee | H04L 1/189 |
| | | | 370/312 |
| 2023/0163896 A1* | 5/2023 | Lin | H04L 1/1858 |
| | | | 370/312 |
| 2023/0180269 A1* | 6/2023 | Li | H04W 72/11 |
| | | | 370/312 |
| 2023/0189298 A1* | 6/2023 | Lee | H04W 72/30 |
| 2023/0209313 A1* | 6/2023 | Chin | H04W 4/06 |
| | | | 370/329 |
| 2023/0276458 A1* | 8/2023 | Lee | H04W 72/232 |
| | | | 370/329 |

* cited by examiner

Initial Cell Search

System Information Reception

Random Access Procedure

General DL/UL Tx/Rx
S18

PSS/SSS & [DL RS] & PBCH

PDCCH/ PDSCH (BCCH)

PRACH

PDCCH/ PDSCH

PRACH

PDCCH/ PDSCH

PDCCH/ PDSCH

PUSCH/ PUCCH

S11   S12   S13   S14   S15   S16   S17

• DL/UL ACK/NACK
• UE CQI/PMI/Rank Report using PUSCH and PUCCH

Non - interleaved CCE - to - REG mapping

METHOD AND APPARATUS FOR TRANSMITTING OR RECEIVING WIRELESS SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2021/010207, filed on Aug. 4, 2021, which claims the benefit of U.S. Provisional Application No. 63/061,776, filed on Aug. 5, 2020, the contents of which are all incorporated by reference herein in their entirety.

TECHNICAL FIELD

The present disclosure relates to a wireless communication system, and more particularly, to a method and apparatus for transmitting/receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, there is provided a method of receiving a signal by a user equipment (UE) in a wireless communication system. The method may include: monitoring a physical downlink control channel (PDCCH) in a search space for a specific multicast service that the UE desires to receive; receiving downlink control information (DCI) having a cyclic redundancy check (CRC) scrambled with a specific radio network temporary identifier (RNTI) as a result of monitoring the PDCCH; repeatedly receiving a transport block (TB) related to the specific multicast service in a multicast frequency part based on the DCI; and transmitting a hybrid automatic repeat request acknowledgement (HARQ-ACK) indicating a decoding result of the TB on a physical uplink control channel (PUCCH) resource indicated by the DCI after the repetition of the TB. The specific RNTI may be a group-RNTI (G-RNTI) associated with the specific multicast service that the UE desires to receive.

The DCI may include at least one of information on a number of times that the TB is repeated or information on the multicast frequency part.

The search space may be located in an active frequency part of the UE.

The active frequency part of the UE may be different from the multicast frequency part.

After completing the repetition of the TB in the multicast frequency part, the UE may be configured to return to the active frequency part of the UE and transmit the HARQ-ACK.

The search space may be associated with a service identifier (ID) of the specific multicast service that the UE desires to receive.

The search space may be selected based on a service ID of the specific multicast service that the UE desires to receive from among a plurality of search spaces.

The TB may be a TB on a traffic channel for the specific multicast service

When the UE fails to decode the TB even after repeating the TB by a number of times indicated by the DCI, the UE may be configured to the HARQ-ACK to a negative acknowledgement (NACK).

In another aspect of the present disclosure, there is provided a computer-readable storage medium having stored thereon a program for executing the above-described signal reception method.

In another aspect of the present disclosure, there is provided a UE configured to perform the above-described signal reception method.

In another aspect of the present disclosure, there is provided an apparatus configured to control the UE configured to perform the above-described signal reception method.

In another aspect of the present disclosure, there is provided a method of transmitting a signal by a base station in a wireless communication system. The method may include: generating DCI having a CRC scrambled with a specific RNTI; transmitting a PDCCH carrying the DCI in a search space for a specific multicast service that the UE desires to receive; repeatedly transmitting a TB related to the specific multicast service in a multicast frequency part based on the DCI; and receiving a HARQ-ACK indicating a decoding result of the TB by the UE on a PUCCH resource indicated by the DCI after the repetition of the TB. The specific RNTI may be a G-RNTI associated with the specific multicast service that the UE desires to receive.

In another aspect of the present disclosure, a base station for performing the signal transmission method may be provided.

Advantageous Effects

According to one embodiment of the present disclosure, a transport (TB) to be multicast to a plurality of user equipments (UEs) may be repeatedly transmitted in downlink control information (DCI), thereby reducing latency. In addition, a hybrid automatic repeat request acknowledgement (HARQ-ACK) may be transmitted after the repetition is completed, thereby reducing physical uplink control channel (PUCCH) overhead.

It will be appreciated by persons skilled in the art that the effects that can be achieved with the present disclosure are not limited to what has been particularly described herein-above and other advantages of the present disclosure will be more clearly understood from the following detailed description taken in conjunction with the accompanying drawings.

DETAILED DESCRIPTION

Figure 1:
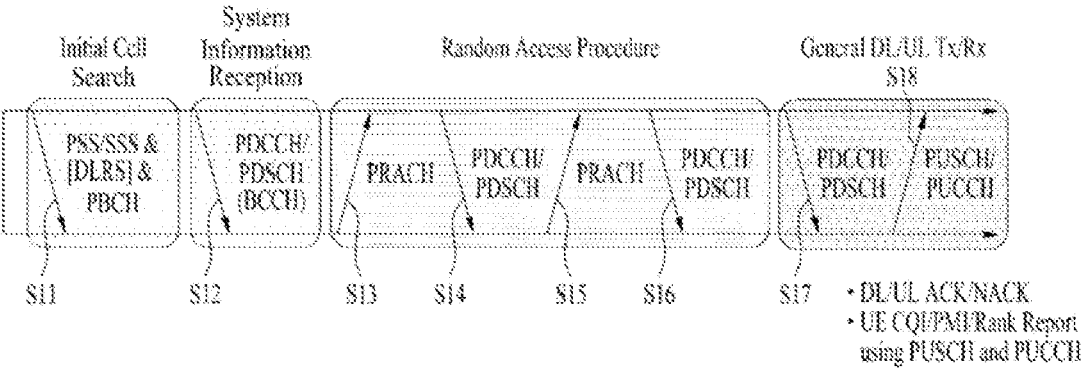
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

The following documents may be referred to for background description, terminology definitions, abbreviations, and the like related to the present disclosure.

3GPP LTE

TS 36.211: Physical channels and modulation

TS 36.212: Multiplexing and channel coding

TS 36.213: Physical layer procedures

TS 36.300: Overall description

TS 36.321: Medium Access Control (MAC)

TS 36.331: Radio Resource Control (RRC)

3GPP NR

TS 38.211: Physical channels and modulation

TS 38.212: Multiplexing and channel coding

TS 38.213: Physical layer procedures for control

TS 38.214: Physical layer procedures for data

TS 38.300: NR and NG-RAN Overall Description

TS 38.321: Medium Access Control (MAC)

TS 38.331: Radio Resource Control (RRC) protocol specification

Abbreviations and Terms

PDCCH: Physical Downlink Control CHannel

PDSCH: Physical Downlink Shared CHannel

PUSCH: Physical Uplink Shared CHannel

CSI: Channel state information

RRM: Radio resource management

RLM: Radio link monitoring

DCI: Downlink Control Information

CAP: Channel Access Procedure

Ucell: Unlicensed cell

PCell: Primary Cell

PSCell: Primary SCG Cell

TBS: Transport Block Size

SLIV: Starting and Length Indicator Value

BWP: BandWidth Part

CORESET: COntrol REsourse SET

REG: Resource element group

SFI: Slot Format Indicator

COT: Channel occupancy time

SPS: Semi-persistent scheduling

PLMN ID: Public Land Mobile Network identifier

RACH: Random Access Channel

RAR: Random Access Response

MBMS: Multimedia Broadcast/Multicast Service

Msg3: Message transmitted on UL-SCH containing a C-RNTI MAC CE or CCCH SDU, associated with the UE contention resolution, as part of a random access procedure Special Cell: For dual connectivity operation, the term special cell refers to the PCell of the MCG or the PSCell of the SCG depending on whether the MAC entity is associated with the MCG or the SCG. Otherwise, the term special cell refers to the PCell. The special cell supports PUCCH transmission and contention-based random access, and is always activated.

Serving Cell: A PCell, a PSCell, or an SCell

MBSFN Synchronization Area: (In case of an LTE network) an area of the network where all eNodeBs can be synchronized and perform MBSFN transmissions. MBSFN synchronization areas are capable of supporting one or more MBSFN areas. On a given frequency layer, an eNodeB can only belong to one MBSFN synchronization area. MBSFN synchronization areas are independent from the definition of MBMS service areas.

MBSFN transmission or a transmission in MBSFN mode: a simultaneous broadcast scheme performed by transmitting the same waveforms at the same time from multiple cells. An MBSFN transmission from multiple cells within the MBSFN area is seen as a single transmission by a UE.

MBSFN Area: an MBSFN area consists of a group of cells within an MBSFN synchronization area of a network, which are co-ordinated for MBSFN. Except for the MBSFN area reserved cells, all cells within the MBSFN area contribute to the MBSFN transmission and advertise availability of MBSFN. The UE may only need to consider a subset of the configured MBSFN area (i.e., service(s) of interest).

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUS CH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
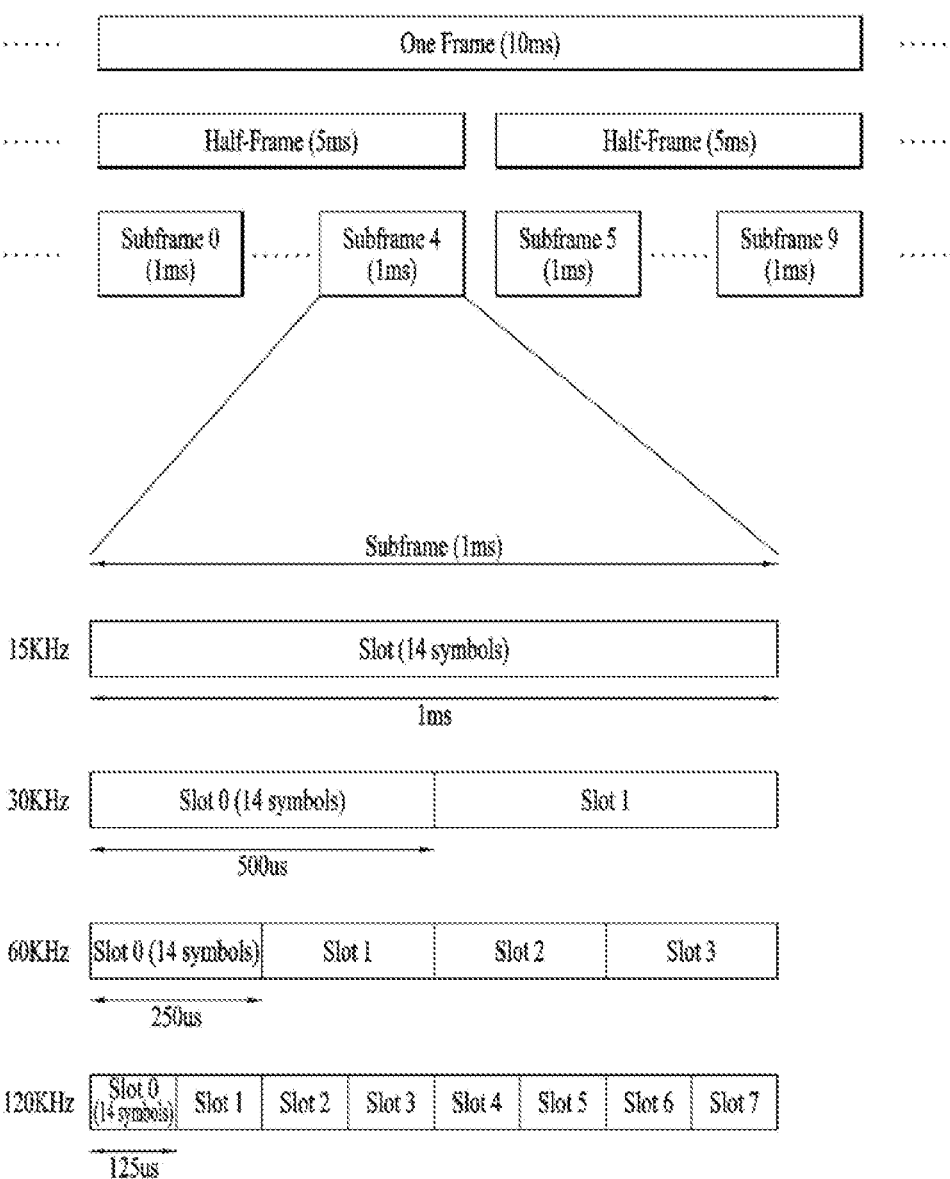
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

$N^{slot}_{symb}$: Number of symbols in a slot
$N^{frame,u}_{slot}$: Number of slots in a frame
$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 kHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
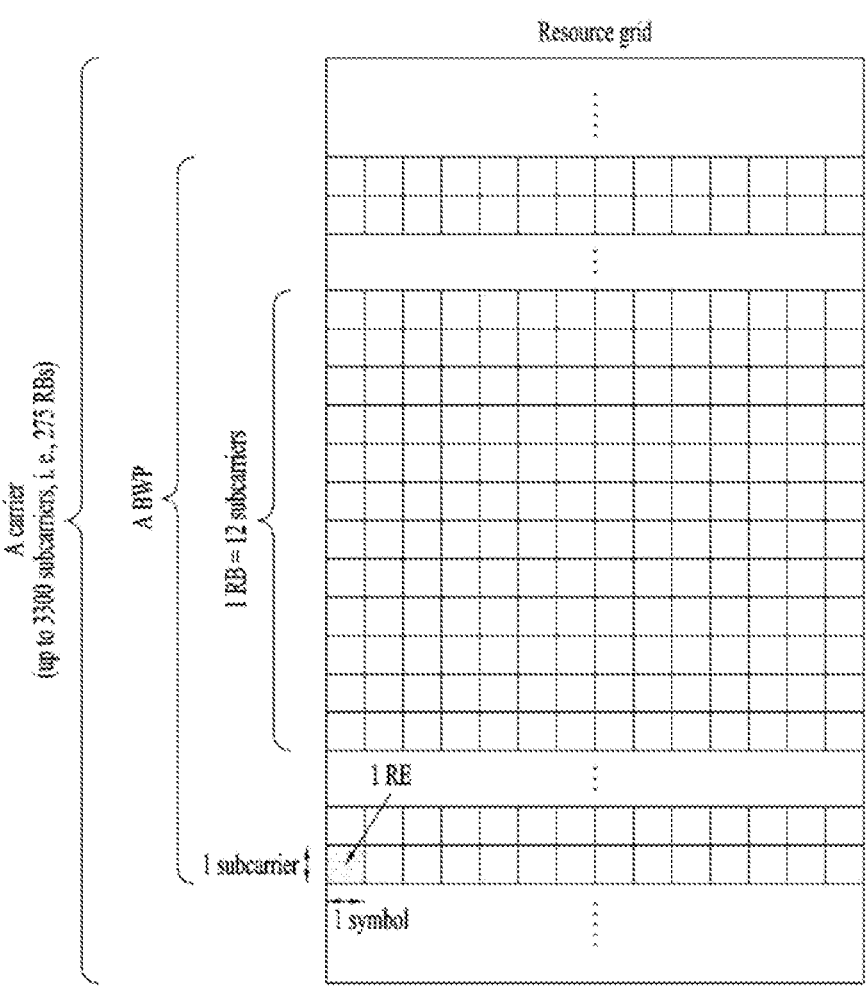
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
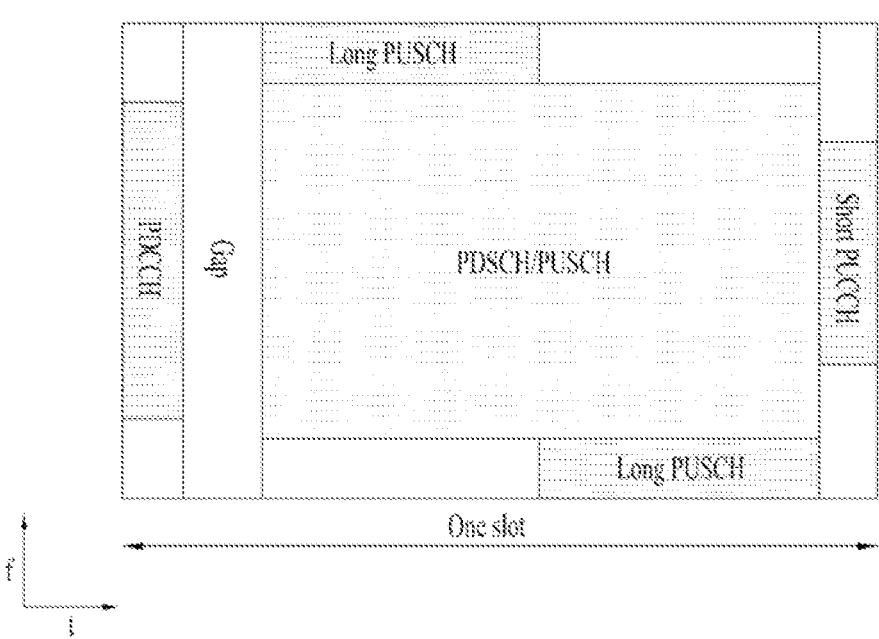
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
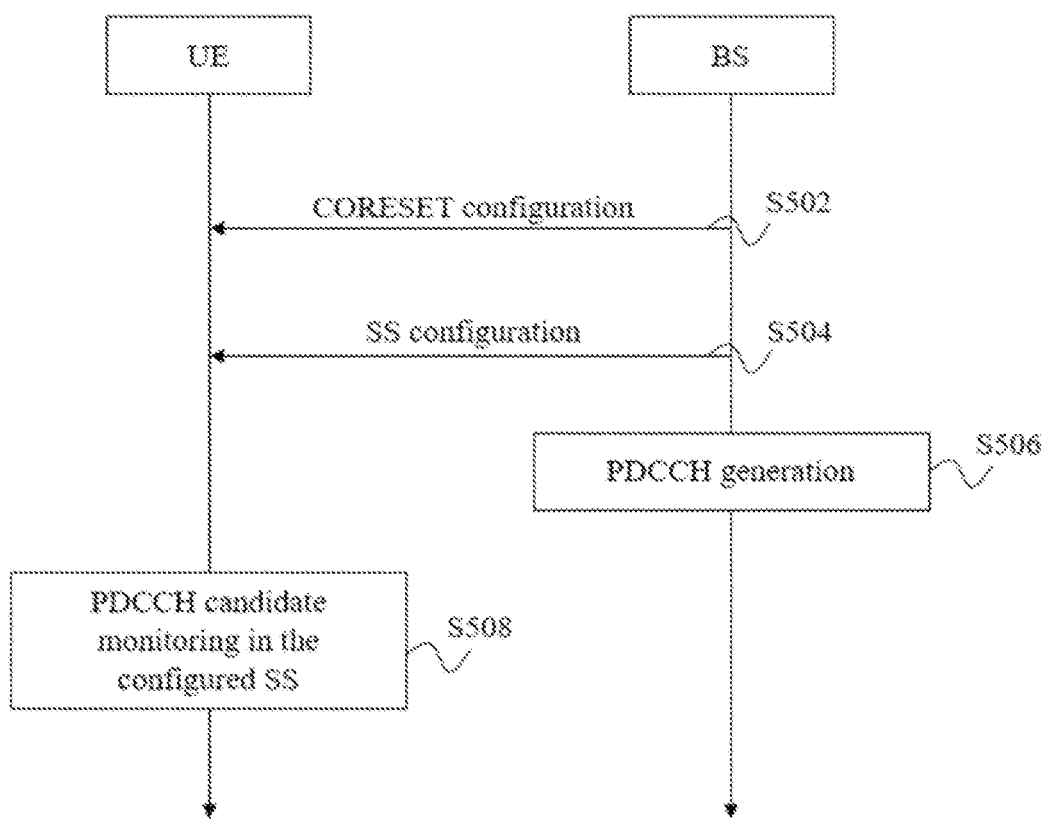
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORSET) configuration to a UE (S502). A CORSET is defined as a resource element group (REG) set having a given numerology (e.g., an SCS, a CP length, and so on). An REG is defined as one OFDM symbol by one (P)RB. A plurality of CORSETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.

frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.

duration: indicates the time resources of the CORESET. Duration indicates the number of consecutive OFDM symbols included in the CORESET. Duration has a value of 1 to 3.

cce-REG-MappingType: indicates a control channel element (CCE)-REG mapping type. Interleaved and non-interleaved types are supported.

interleaverSize: indicates an interleaver size.

pdcch-DMRS-ScramblingID: indicates a value used for PDCCH DMRS initialization. When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown in FIG. 5 as separately signaled, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.
   controlResourceSetId: indicates a CORESET associated with the SS.
   monitoringSlotPeriodicityAndOffset: indicates a periodicity (in slots) and offset (in slots) for PDCCH monitoring.
   monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.
   nrofCandidates: indicates the number of PDCCH candidates (one of values 0, 1, 2, 3, 4, 5, 6, and 8) for each AL where AL={1, 2, 4, 8, 16}.
   searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |

TABLE 4-continued

| DCI format | Usage |
|---|---|
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Figure 6:
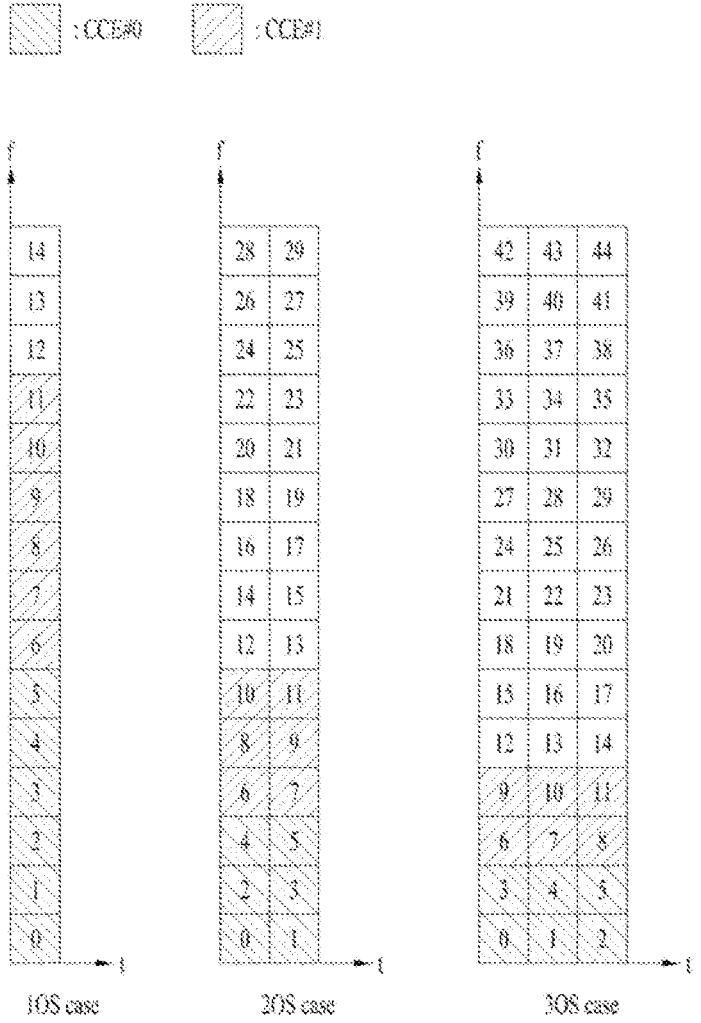
FIGS. 6 and 7 illustrate exemplary control resource set (CORESET) structures.
Figure 7:
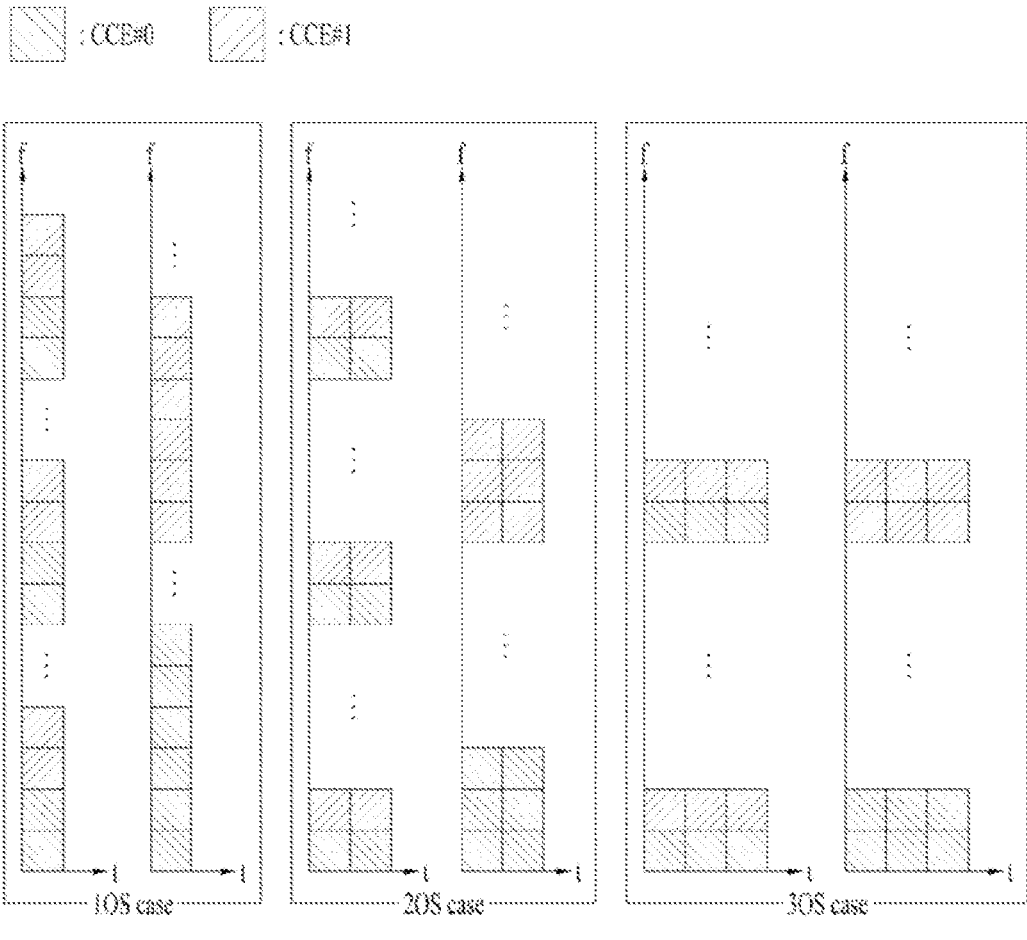

Interleaved CCE-to-REG mapping (or distributed CCE-to-REG mapping) (FIG. 6): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is config-
ured on a CORESET basis.

MBMS (Multimedia Broadcast/Multicast Service)

Next, the MBMS scheme of 3GPP LTE will be described.
3GPP MBMS may be divided into an SFN scheme, in which
multiple BS cells are synchronized to transmit the same data
on the PMCH, and a single cell point to multipoint (SC-
PTM) scheme, in which multiple BS cells are synchronized
to broadcast within a corresponding cell coverage on the
PDCCH/PDSCH. The SFN scheme is used to provide a
broadcast service in a wide area (e.g. MBMS area) through
resources pre-allocated semi-statically, while the SC-PTM
scheme is mainly used to provide a broadcast service only
within a cell coverage through dynamic resources.

The SC-PTM provides one logical channel SC-MCCH
(Single Cell Multicast Control Channel) and one or more
logical channels SC-MTCHs (Single Cell Multicast Traffic
Channels). These logical channels are mapped to a trans-
mission channel DL-SCH and a physical channel PDSCH.
The PDSCH carrying SC-MCCH or SC-MTCH data is
scheduled on a PDCCH indicated by G-RNTI. In this case,
a TMGI corresponding to a service ID may be mapped to a
specific G-RNTI value in a one-to-one correspondence
manner. Accordingly, when the BS provides a plurality of
services, a plurality of G-RNTI values may be allocated for
SC-PTM transmission. One or more UEs may perform
PDCCH monitoring using a specific G-RNTI to receive a
specific service. Here, an SC-PTM dedicated DRX on-
duration period may be configured for the specific service/
specific G-RNTI. In this case, the UEs wake up only in a
specific on-duration period to perform PDCCH monitoring
for the G-RNTI.

Cross-Bandwidth Part Scheduling

The above-described configurations (3GPP system, frame
structure, NR system, etc.) may be applied in combination
with methods proposed in an embodiment of the present
disclosure, or may be supplemented to clarify the technical
features of the methods proposed in an embodiment of the
present disclosure. As used herein, "/" may mean "and,"
"or," or "and/or" depending on the context.

To access an NR cell, the UE needs to be able to receive
an MIB and SIB1 over an SSB/PBCH. In addition, the UE
may receive other system information (SI) messages (e.g.,
SIB1) based on initial DL/UL BWP configuration informa-
tion included in SIB1, Type0A-PDCCH common search
space configuration information, and CORESET configura-
tion information therefor. Considering that other SI mes-
sages are not always broadcast, when the UE is in the (RRC)
idle/inactive state, the UE may request other SI messages by
triggering a RACH in an initial UL BWP. In this case, the
requested SI messages may be indicated by a RACH pre-
amble, or a specific SI message may be requested by an RRC
message included in RACH MSG3 or MSGA. Thereafter,
the UE may receive the other SI messages over a PDSCH
indicated by DCI received on a PDCCH occasion in an
initial DL BWP. The PDCCH occasion may be based on
Type0A-PDCCH common search space configuration infor-
mation and CORESET configuration information therefor.
On the other hand, when the UE is in the (RRC) connected
state, the UE may request a specific SIB by transmitting a
specific RRC message in an active UL BWP.

When the UE is in the (RRC) idle/inactive state, the UE
may maintain the initial DL/UL BWP before entering the
connected state. The UE may receive an RRC Setup mes-
sage or an RRC Resume message in the initial DL BWP, and
the corresponding message may include configuration infor-
mation on one or more UE-dedicated BWPs. Upon receiving the UE-dedicated BWP configuration information, the UE
may use an active BWP rather than the initial BWP to
perform DL/UL communication with the BS.

REL-17 NR intends to introduce a DL broadcast or DL
multicast transmission method to support MBMS services.
In a point-to-multipoint (PTM) transmission method such as
the MBMS, transmission to multiple UEs is allowed by one
DL broadcast/multicast transmission, and thus the PTM
transmission method has an advantage of saving radio
resources, compared to when one DL unicast transmission is
transmitted to each UE (e.g., point-to-point transmission).
Therefore, the BS may configure an MBMS BWP for the
MBMS to maximize the gain of PTM transmission.

However, in the NR system, the UE in the (RRC) idle/
inactive state may configure the initial BWP, and the UE in
the connected state may configure its own active BWP. As
a result, the following problem may occur: the UE may
simultaneously activate the initial/active BWP and the
MBMS BWP depending on the UE capability, but the UE
may be unable to transmit and receive unicast and multicast/
broadcast at the same time.

Therefore, the present disclosure proposes a method for a
UE to receive DL broadcast/multicast transmission to effec-
tively switch a BWP depending on the capability of the UE
and effectively save the power of the UE. Hereinafter,
DL/UL BWP(s) are assumed and described as frequency
bands related to MBMS services. However, the present
disclosure is not limited to the term "BWP", and the
expression of DL/UL BWP(s) may be interpreted to include
various frequency sizes/resources/parts corresponding to
parts of the entire DL/UL frequency bands. For example, a
UE-common (BWP frequency) resource/part for providing
MBMS services may be simply referred to as a common
frequency resource (CFR).

The UE may configure a first DL BWP and a first UL
BWP. The UE may perform initial access or UE-
dedicated transmission based on the first DL BWP
and/or the first UL BWP.

a. The first DL BWP may be an initial DL BWP or an
active DL BWP.

b. The first UL BWP may be an initial UL BWP or an
active UL BWP.

The UE may receive the configuration of one or more
specific DL BWPs for services from a second DL BWP.
The first DL BWP may be the same as or different from
the second DL BWP. A DL BWP configuration may
provide mapping/association between one or more spe-
cific DL BWPs and one or more services.

a. The UE may receive the DL BWP configuration
through UE-specific signaling or MBMS control infor-
mation common to UEs.

b. The service may be a broadcast/multicast service that
one or more UEs intend to receive.

If the UE indicates one of the services to the BS, the UE
may receive a search space set configuration related to
the indicated service in the first DL BWP. The search
space set configuration may include a CORSET con-
figuration and a G-RNTI value corresponding to the
indicated service. The search space set may be specific
to broadcast/multicast or at least to the indicated ser-
vice.

The UE may monitor a PDCCH in the search space set in
the first DL BWP where unicast transmission is
received.

Upon receiving DCI indicating PDSCH transmission in a
third DL BWP, the UE may switch to the third DL BWP and receive the PDSCH transmission. The third DL BWP may be the same as or different from the second DL BWP.

a. One, two, or three of the first DL BWP, second DL BWP, and third DL BWP may belong to the same cell or different cells. At least one of the cells may be a serving cell for the UE b. One, two, or three of the first DL BWP, second DL BWP and third DL BWP may be the same BWP.

When DCI includes a PUCCH resource indicator indicating a PUCCH resource, the UE may transmit HARQ feedback in the active UL BWP to the BS, depending on the decoding state of a TB for PDSCH transmission. After successfully receiving the TB, the UE may switch back to the first DL BWP.

Transmitting Side (e.g., BS):

When a cell is configured to broadcast an MBMS service, the BS may transmit SIB1, an MBMS SIB, one or more MCCHs, and/or one or more MTCHs. In this case, the MCCH and MTCH, which are logical channels, may be transmitted over PDSCH corresponding to a physical channel, and the PDSCH carrying the MCCH/MTCH may be scheduled by a PDCCH. The MCCH may carry service control information (e.g., MBMS control information), and one MTCH may carry specific MBMS service data.

The BS may provide BWP(s) for the MBMS (hereinafter referred to as MBMS BWP(s)) to UEs. The MBMS BWP(s) may include at least parts of an MBMS SIB_DL BWP and MBMS SIB_UL BWP for transmitting and receiving the MBMS SIB; an MCCH_DL BWP and MCCH_UL BWP for transmitting and receiving the MCCH; and an MTCH_DL BWP and MTCH_UL BWP for transmitting and receiving the MTCH. One cell may provide zero, one, or more MBMS DL BWPs and also provide zero, one, or more MBMS UL BWPs. Therefore, if the BS supports the MBMS, the BS may provide all types of MBMS BWPs described above in addition to a conventional initial BWP or a UE-dedicated BWP. Alternatively, the BS may provide zero or some MBMS BWP(s). Some or all MBMS BWPs may be the same as or different from a conventional initial BWP, default BWP, initial active BWP, or active BWP.

For example, the BS may transmit the MBMS SIB and SIB1 in an initial DL BWP. The BS may transmit a PDCCH/PDSCH for an MCCH and MTCH in the initial DL BWP or a separate DL BWP (hereinafter referred to as an MBMS DL BWP). Alternatively, the MBMS SIB may also be transmitted in the MBMS SIB_DL BWP. In addition, the MBMS SIB_UL BWP for the UE to request the MBMS SIB on-demand may be configured separately.

The MBMS SIB may provide at least one of separate MCCH DL/UL BWP configuration information for one or more MCCHs and PDCCH CSS set configuration information for transmitting the MCCH. In addition, the MBMS SIB or service control information (e.g., MBMS control information) may provide at least one of separate MTCH DL/UL BWP configuration information for one or more MTCHs and PDCCH MBMS-dedicated search space (MSS) set configuration information for transmitting the MTCH.

MBMS BWP configuration information may include information on the frequency location, bandwidth size, and/or SCS of a corresponding BWP. The MBMS BWP may be included in the same cell as the initial BWP or may be included in another cell (hereinafter referred to as an MBMS SCell). When the UE intends to receive an MBMS service, the UE may configure the MBMS BWP and MBMS S Cell, regardless of the RRC state of the UE. Then, the UE may receive a PDCCH/PDSCH carrying MCCH/MTCH data.

Meanwhile, the BS may transmit service control information (e.g., MBMS control information) to the UE in the (RRC) connected state through UE-dedicated signaling.

When the BS provides the MBMS, the BS may broadcast at least some of the following information in a corresponding cell.

Information Included in SIBx (e.g., SIB1)

a. Information indicating whether the MBMS SIB is being broadcast may be provided.

b. Information instructing the UE to use a Type0A-PDCCH CSS set to receive the MBMS SIB or configuration information on a new CORSET and PDCCH CSS set type for receiving the MBMS SIB may be provided.

c. If the MBMS SIB and MCCH/MTCH are transmitted in a DL BWP different from the initial DL BWP, configuration information on the DL BWP for the MBMS may be provided.

d. Specific RNTI (e.g., G-RNTI or single cell (SC)-RNTI) value(s) for one or more MCCHs may be provided. The specific RNTI (e.g., G-RNTI or SC-RNTI) may have a different value for each MCCH. For example, the specific RNTI value may be allocated/configured differently/independently for each MBMS service (ID).

e. Information on whether the MBMS SIB is currently being broadcast and information on a RACH preamble and/or RACH resource for requesting the MBMS SIB in an on-demand manner if the MBMS SIB is not being broadcast may be provided.

Information Included in MBMS SIB a. MBMS DL BWP configuration information i. Information on the BWP-ID, frequency location, bandwidth size, and/or SCS of a DL BWP for transmitting the PDCCH/PDSCH for the MCCH/MTCH may be provided.

ii. When the UE intends to receive an MBMS service, the UE may receive configuration information and activate the MBMS DL BWP. In this case, the UE may deactivate the initial DL BWP, receive the initial DL BWP and the MBMS DL BWP simultaneously, or receive the initial DL BWP and the MBMS DL BWP at different times. The MBMS DL BWP for transmitting and receiving MCCH data is referred to as an MCCH_DL BWP, which may be the same as or different from an MTCH_DL BWP for transmitting and receiving MTCH data.

b. PDCCH MSS set configuration information for scheduling MCCH data transmission i. The MCCH may carry service control information (e.g., MBMS control information), and the UE may receive DCI for scheduling the service control information (e.g., MBMS control information) on the MCCH based on an MBMS-dedicated PDCCH MSS set type. To this end, the UE may receive the PDCCH MSS set configuration information in the MBMS SIB. The UE may receive DCI for scheduling MCCH data by monitoring the corresponding PDCCH MSS set. In this case, the CRC of the DCI may be scrambled with a specific RNTI (e.g., G-RNTI, or SC-RNTI).

ii. A search space for scheduling/transmission of the service control information (e.g., MBMS control information) on the MCCH may be replaced with an MSS or a USS.

Figure 10:
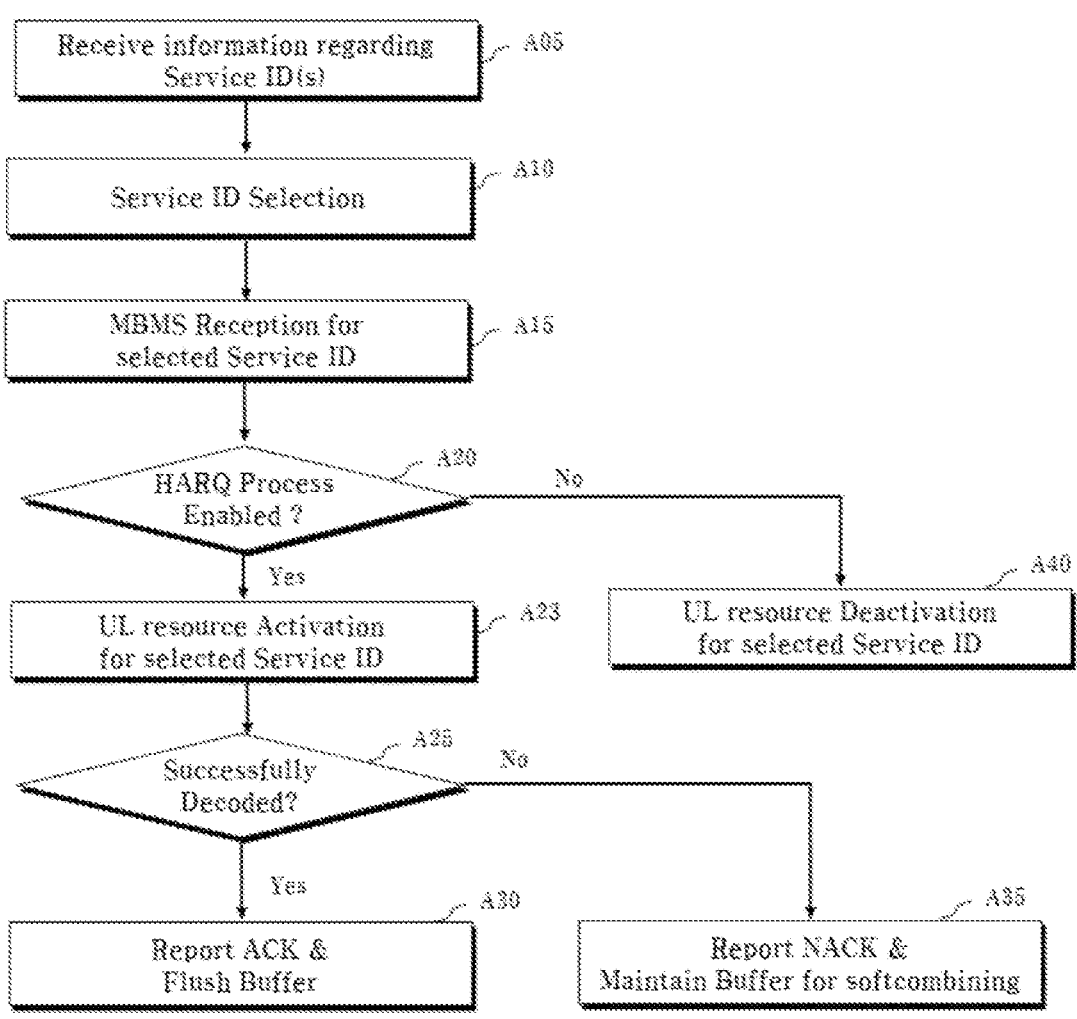
FIG. 10 illustrates MBMS-related hybrid automatic repeat request (HARQ) feedback according to an embodiment of the present disclosure.

Content of Service Control Information (e.g., MBMS Control Information) on MCCH a. The BS may provide configuration information on one or more DL BWPs.

i. BWP configuration information may include at least one of a BWP ID, an SCS, a bandwidth size, and a frequency position.

ii. The DL BWP may be related to one of the initial DL BWP, MBMS DL BWP, and active BWP of the UE. In this case, the MBMS DL BWP for transmitting and receiving MTCH data is referred to as an MTCH_DL BWP, which may be the same as or different from the MCCH_DL BWP for transmitting and receiving MCCH data.

b. The BS may provide a list of MBMS service IDs (e.g., temporary mobile group identity (TMGI) list) for each DL BWP.

i. The BS may inform the UE of the ID of at least one MBMS service transmitted in a specific DL BWP. The MBMS service ID may be mapped/associated with a specific MTCH. MBMS service data (e.g., specific mapped MTCH) may be transmitted over the PDSCH.

ii. The UE may activate a DL BWP where an MBMS service to be received is transmitted. Then, the UE may receive the MBMS service data in the corresponding DL BWP.

c. The BS may provide a G-RNTI mapped/associated with the MBMS service ID. The G-RNTI may be mapped/associated with each MBMS service ID.

d. The BS may inform whether HARQ feedback transmission (e.g., a HARQ process for reporting HARQ-ACK) (in response to PDSCH transmission carrying MBMS service data) is activated/deactivated for each MBMS service ID.

e. The BS may provide configuration information on UL PUCCH resources for HARQ feedback transmission or MBMS CSI transmission for each MBMS service ID.

f. The BS may provide configuration information on a MBMS UL BWP for HARQ feedback transmission or MBMS CSI transmission for each MBMS service ID.

i. When the UE intends to receive specific MBMS service data, if HARQ feedback transmission for the corresponding MBMS service is enabled, the UE may activate an MBMS UL BWP mapped to the corresponding MBMS service and transmit the HARQ feedback in the MBMS UL BWP. The MBMS-related HARQ feedback of the UE may be allowed/performed only when it is indicated that HARQ feedback transmission is enabled for the corresponding MBMS service ID.

ii. FIG. 10 is a diagram for explaining MBMS-related HARQ feedback according to an embodiment of the present disclosure. Referring to FIG. 10, the UE may receive information on one or more service IDs from the BS (A05). The UE may select the service ID of a service to be received from among the one or more service IDs (A10). The UE may perform MBMS reception based on the selected service ID (A15). If a HARQ process is activated for the selected service ID (Yes in A20), the UE may configure/activate a UL frequency resource (e.g., UL resource for HARQ feedback) associated with the selected service ID (A23). If the UE successfully decodes the MBMS reception, the UE may transmit an ACK and flush a corresponding HARQ buffer (A30). If the UE fails to decode the MBMS reception, the UE may transmit a NACK and maintain the corresponding HARQ buffer for soft combining (A35).

g. The BS may provide configuration information on a search space set mapped/associated with the MBMS service ID.

i. The BS may map/associate one or more MBMS service IDs with a specific MBMS search space set (hereinafter referred to as an MSS set). In the present disclosure, an MSS may be defined as anew type of CSS, a USS, or anew type of search space other than the CSS/USS. Configuration information on a search space set associated with each MBMS service ID may be provided.

ii. The UE may activate a DL BWP where an MBMS service to be received is transmitted and then monitor a PDCCH in the specific MSS set mapped/associated with the MBMS service.

iii. The UE may monitor the PDCCH in the MSS and receive DCI scrambled with a CRC based on a G-RNTI mapped/associated with the MBMS service. The UE may obtain MBMS service data by receiving a PDSCH indicated by the corresponding DCI.

iv. The G-RNTI-based DCI may indicate HARQ feedback over a PUCCH or PUSCH. When the G-RNTI-based DCI indicates HARQ feedback, and when HARQ feedback transmission is activated for the MBMS service, the UE may activate an MBMS UL BWP mapped to the corresponding MBMS service and transmit the HARQ feedback in the MBMS UL BWP.

On the other hand, the BS may configure an MSS set in a specific active BWP (e.g., BWP1 in FIG. 8) for the connected UE and then instruct the UE to monitor a PDCCH occasion in the MSS set within the current active BWP. Then, the BS may instruct the UE to switch to an MCCH/MTCH BWP (e.g., BWP2 in FIG. 9) in specific DCI and allow the UE to receive MCCH or MTCH transmission. To this end, the UE may provide the BS with service information that the UE desires to receive through the current active UL BWP.

Receiving Side (e.g., UE):

Hereinafter, UE operations will be described. In one embodiment of the present disclosure, the active BWP of an idle/inactive UE may mean an initial BWP, and the active BWP of a connected UE may mean a specific BWP that is currently active among multiple UE BWPs.

If the UE is incapable of receiving an MBMS SIB, SIB1, or MBMS control information in the active BWP of the UE, the UE may request the BS to transmit the MBMS control information without BWP switching. To this end, the UE may transmit an MBMS indicator requesting the MBMS control information in UCI, a MAC CE, or an RRC message. The MBMS indicator may be mapped/associated with one or more service IDs. For example, the MBMS indicator may be determined as follows: MBMS indicator=TMGI mod N, where N may be configured by the BS in SIB1, etc. Upon receiving the MBMS indicator or a specific MBMS indicator value, the BS may transmit information on an MCCH BWP, an MCCH, and/or an MBMS SIB, which are mapped to the received MBMS indicator, to the UE through UE-dedicated signaling.

When the UE supports the MBMS, the BS may configure a plurality of BWPs to the UE. Among the plurality of BWPs, at least one BWP may be configured for an SIB/MCCH/MTCH BWP. The SIB/MCCH/MTCH BWP may be set to the default BWP or initial BWP of the UE. Alternatively, the SIB/MCCH/MTCH BWP may be set to a BWP other than the default BWP and initial BWP.

Accordingly, when the UE is capable of receiving SIB1 in the active BWP of the UE, the UE may determine whether the MBMS SIB is provided, based on SIB1. If the UE determines that a selected cell supports the MBMS SIB, the UE may obtain CSS configuration information for reception of the MBMS SIB from SIB 1. When the UE is capable of receiving the MBMS SIB in the active BWP of the UE, the UE may acquire the MBMS SIB without BWP switching. In addition, when the UE is capable of receiving the MCCH in the active BWP of the UE, the UE may acquire the MCCH without BWP switching.

The BS may configure an MSS set in the active BWP (BWP1) of the current UE for a specific UE. In this case, the UE may monitor a PDCCH occasion in the MSS set and obtain DCI having a CRC scrambled with an SC-RNTI. The corresponding DCI may include some or all of the following information shown in Table 5. For example, in FIG. 8, the DL BWP ID of DCI may indicate ID2.

Table 5 illustrates at least some parts included in DCT for the MRMS

TABLE 5

Identifier for DCI formats - 1 bits
DL BWP ID = BWP-ID set to 1 or 2
Cell Index indicating a cell where the BWP of the above DL BWP ID is configured.
Frequency domain resource assignment
Time domain resource assignment
VRB-to-PRB mapping
Modulation and coding scheme
New data indicator - 1 bit
Redundancy version
HARQ process number - 4 bits
Downlink assignment index
TPC command for scheduled PUCCH
PUCCH resource indicator
PDSCH-to-HARQ feedback timing indicator Upon receiving the DCI, the UE may switch to and activate BWP2 and receive an MCCH TB over a PDSCH based on information in the DCI. The MCCH TB may include MBMS control information. The MCCH TB may also include an MBMS service ID list provided in BWP2 and a G-RNTI mapped to each service ID. The MCCH TB may include an MBMS service ID list provided in another MBMS BWP and a G-RNTI mapped to each service ID.

If the DCI includes a PUCCH resource indicator, the UE may transmit to the BS a HARQ A/N indicating the decoding state of the MCCH TB on a corresponding PUCCH resource. Accordingly, the BS may retransmit the MCCH TB in BWP2.

If the UE desires to receive a service corresponding to a specific MBMS service ID, the connected UE may transmit UE-dedicated MBMS service information to the BS based on the MBMS service ID list. The MBMS service information may be provided to the BS in an RRC message, a MAC CE, or UCI.

For example, the MBMS service information may indicate the order of listing service IDs that the UE desires to receive in the MBMS service ID list of the MBMS control information. For example, the UE may obtain MBMS service ID list={TMGI #1, TMGI #2, TMGI #3, . . . , TMGI #8} from the MBMS control information. If the UE desires to receive TMGI #3 and TMGI #8, the UE may include Index=3 and Index=8 in the MBMS service information dedicated to the UE. Alternatively, the UE-dedicated MBMS service information may be configured with an 8-bit bitmap, and the bitmap may be configured with {0010 0001} to transmit the MBMS service information to the BS. Accordingly, upon receiving the MBMS service information from the UE, the BS may identify an MBMS service that the corresponding UE desires to receive.

Figure 8:
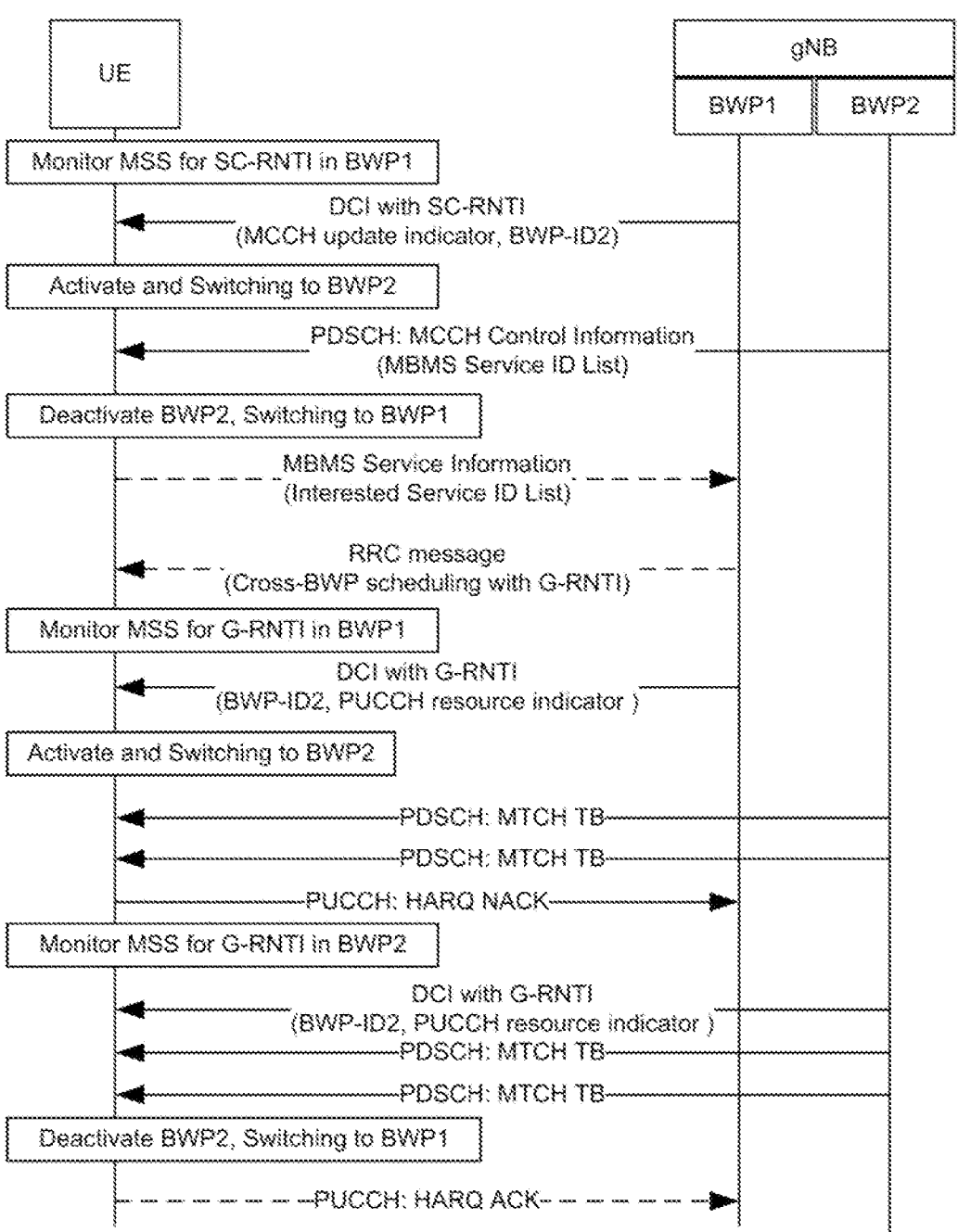
FIGS. 8 and 9 illustrate multimedia broadcast/multicast service (MBMS) bandwidth part (BWP) switching based on a specific radio network temporary identifier (RNTI) and cross-BWP group scheduling according to an embodiment of the present disclosure.

FIG. 8 is a diagram for explaining MBMS BWP switching based on a G-RNTI and cross-BWP group scheduling according to an embodiment of the present disclosure.

Referring to FIG. 8, the BS may provide a service-dedicated RNTI, i.e., G-RNTI, mapped to an MBMS service that the UE desires to receive and configuration information on cross-BWP scheduling. For example, the BS may inform that a specific MBMS service is provided in BWP2 and configure the G-RNTI and MSS set for the corresponding service in BWP1. When the MSS set is configured for the service as described above, the UE may periodically monitor a PDCCH occasion in the MSS set of BWP1. In this case, the UE may receive DCI having a CRC scrambled with the G-RNTI over a PDCCH. The corresponding DCI may include some or all of the information shown in Table 5.

For example, in FIG. 8, a DL BWP ID of DCI may indicate ID2. In this case, the UE may switch to DL BWP2, activate BWP2, receive a PDSCH based on information in the DCI, and decode an MTCH TB based on the PDSCH. If the DCI includes a PUCCH resource indicator, the UE may inform the BS of the decoding state (e.g., ACK/NACK) of the MTCH TB based on a corresponding PUCCH resource.

The BS may transmit the MTCH TB based on bundling for reliability enhancement. For example, the MTCH TB may be repeatedly transmitted N times without HARQ feedback. In this case, the value of N or information on repeated resource allocation may be indicated by DCI, a MAC CE, or an RRC message. If the DCI includes the PUCCH resource indicator, the UE may inform the BS of the decoding state (e.g., ACK/NACK) of the corresponding MTCH TB based on the corresponding PUCCH resource after the N times of bundling-based transmission ends.

Upon receiving a NACK, the BS may retransmit the MTCH TB. In the bundling-based transmission, the BS may repeat the MTCH TB retransmission N times.

When the UE successfully receives the MTCH TB, if the MTCH TB is the last transmission, the UE may switch to BWP1 based on an indication of the BS or a timer. The UE may transmit a HARQ-ACK for the last MTCH TB after or before switching to BWP1. Alternatively, the UE may skip the corresponding HARQ-ACK.

Figure 9:
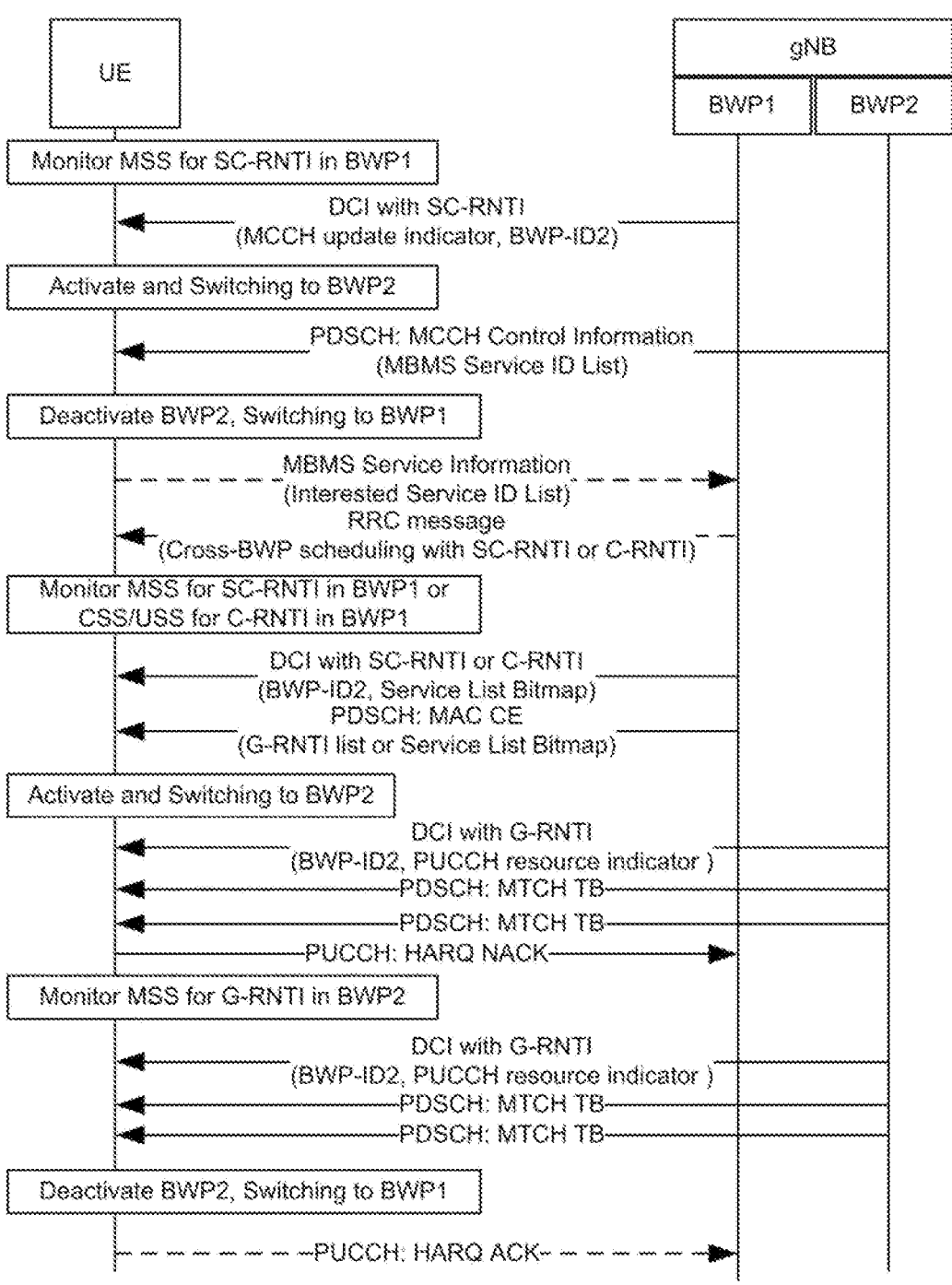

FIG. 9 illustrates MBMS BWP switching based on a C-RNTI or SC-RNTI and cross-BWP group scheduling according to an embodiment of the present disclosure.

Referring to FIG. 9, the BS may provide configuration information on cross-BWP scheduling mapped to an MBMS service that the UE desires to receive. Specifically, the BS may provide the cross-BWP scheduling based on a common RNTI, that is, SC-RNTI. For example, the BS may inform that a specific MBMS service is provided in BWP2 and configure the SC-RNTI and MSS set for the corresponding service in BWP1. When the MSS set is configured for the service as described above, the UE may periodically monitor a PDCCH occasion in the MSS set of BWP1. In this case, the UE may receive DCI having a CRC scrambled with the SC-RNTI over a PDCCH. The corresponding DCI may include the information shown in Table 5.

Alternatively, in the case of a connected UE, the BS may provide configuration information on cross-BWP scheduling mapped to an MBMS service the UE desires to receive as shown in FIG. 9. Specifically, the cross-BWP scheduling may be provided based on a UE-dedicated RNTI, i.e., C-RNTI. For example, the BS may inform that a specific MBMS service is provided in BWP2 and provide DCI having a CRC scrambled with the C-RNTI in a UE-dedicated USS set for the cross-BWP group scheduling. Alternatively, the BS may provide the DCI having the CRC scrambled with the C-RNTI in CSS Type 3. In this case, the UE may periodically monitor a PDCCH occasion in the USS or CSS Type 3. The UE may receive the DCI having the CRC scrambled with the C-RNTI over a PDCCH. The corresponding DCI may include some or all of the information shown in Table 5.

The DCI having the CRC scrambled with the SC-RNTI or C-RNTI may include the following service list information. For example, the UE may obtain MBMS service ID list={TMGI #1, TMGI #2, TMGI #3, . . . , TMGI #8} from MBMS control information received through UE-dedicated signaling or over an MCCH. Then, the UE may receive all services. In this case, if the BS desires to transmit a service corresponding to TMGI #3 in BWP2, the DCI transmitted by the BS may include a binary value corresponding to Index=3. Alternatively, the DCI may be configured with {0010 0000} as the service list information. Accordingly, the UE may determine which service is scheduled over a PDSCH of BWP2.

In this case, the UE may switch to DL BWP2, activate BWP2, receive a PDSCH based on information in the DCI, and decode an MTCH TB based on the PDSCH. If the DCI includes a PUCCH resource indicator, the UE may inform the BS of the decoding state (e.g., ACK/NACK) of the MTCH TB based on a corresponding PUCCH resource.

Alternatively, the DCI having the CRC scrambled with the SC-RNTI, the C-RNTI, or a new MBMS-related RNTI may carry an MBMS scheduling MAC CE over a PDSCH transmitted in BWP1. The UE may be configured with the new RNTI through SIB1, an MBMS SIB, an MCCH, or UE-dedicated signaling. Upon receiving the corresponding DCI, the UE may receive the PDSCH transmission in BWP1 indicated by the DCI and then obtain the MAC CE. The MAC CE may broadcast a service list during a specific period in BWP2. For example, the MAC CE may include MBMS service ID list={TMGI #1, TMGI #2, TMGI #3, . . . , TMGI #8} or G-RNTI list={G-RNTI #1, G-RNTI #2, G-RNTI #3, . . . , G-RNTI #8}. If the MAC CE includes an ID of the service that the UE desires to receive (for example, TMGI or G-RNTI), the UE may switch to DL BWP2 and activate BWP2 after acquiring the MAC CE. In this case, the BS may configure an MSS set in BWP2, and the UE may monitor a PDCCH occasion in the MSS set and receive DCI having a CRC with a G-RNTI. Then, the UE may receive a PDSCH based on information in the DCI and decode an MTCH TB based on the PDSCH. If the DCI includes a PUCCH resource indicator, the UE may inform the BS of the decoding state (e.g., ACK/NACK) of the MTCH TB based on a corresponding PUCCH resource.

The BS may transmit the MTCH TB based on bundling for reliability enhancement. For example, the MTCH TB may be repeatedly transmitted N times without HARQ feedback. In this case, the value of N or information on repeated resource allocation may be indicated by DCI, a MAC CE, or an RRC message. If the DCI includes the PUCCH resource indicator, the UE may inform the BS of the decoding state (e.g., ACK/NACK) of the corresponding MTCH TB based on the corresponding PUCCH resource after the N times of bundling-based transmission ends.

Upon receiving a NACK, the BS may retransmit the MTCH TB. In the bundling-based transmission, the BS may repeat the MTCH TB retransmission N times.

When the UE successfully receives the MTCH TB, if the MTCH TB is the last transmission, the UE may switch to BWP1 based on an indication of the BS or a timer. The UE may transmit a HARQ-ACK for the last MTCH TB after or before switching to BWP1. Alternatively, the UE may skip the corresponding HARQ-ACK transmission.

In FIGS. 8 and 9, BWP1 and BWP2 may belong to the same serving cell or different cells. If BWP1 and BWP2 belong to different cells, BWP1 may belong to one UE serving cell, and BWP2 may belong to an MBMS-dedicated SCell or another UE serving cell. BWP1 and BWP2 may or may not overlap with each other. The numerologies (e.g., SCSs) of BWP1 and BWP2 may be the same or different. The BS may need to schedule the PDCCH/PDSCH in consideration of the BWP switching time depending on the capability of the UE or the configuration difference between the different BWPs. The BWP switching time may be transmitted in the DCI. Meanwhile, BWP1 and BWP2 may be the same BWP or different BWPs.

On the other hand, when the UE in the (RRC) idle/inactive state activates an MBMS DL BWP in all of the above-described steps, the (RRC) idle/inactive UE may deactivate an initial DL BWP, receive the initial DL BWP and MBMS DL BWP simultaneously, or receive the initial DL BWP and MBMS DL BWP at different times. For example, the UE periodically switches to the MBMS DL BWP (e.g. BWP2) according to the MSS set configuration for a specific MCCH or MSS set configuration for a specific MTCH. After monitoring a PDCCH occasion, the UE may switch back to the initial DL BWP (e.g. BWP1) for a paging occasion (PO) or for serving cell measurement. Alternatively, when the PO of the UE overlaps with PDSCH TB transmission for an MBMS-related CSS/MSS, an MBMS SIB, or an MCCH/MTCH, if the UE is incapable of performing simultaneous reception, the UE may receive the PO with priority, the MBMS SIB with priority, an MCCH CSS set or MCCH TB with priority, or an MTCH MSS set or MTCH TB with priority, which is designated to have high priority by the BS/UE.

When the (RRC) idle/inactive UE activates an MBMS UL BWP in all of the above-described steps, the (RRC) idle/inactive UE may deactivate an initial UL BWP, transmit the initial UL BWP and MBMS UL BWP simultaneously, or transmit the initial UL BWP and MBMS UL BWP at different times. For example, the UE may switch to the MBMS UL BWP to transmit HARQ feedback. After PUCCH HARQ-ACK transmission or PUCCH HARQ feedback transmission for an SIB/MCCH/MTCH TB or after completion of a RACH procedure for HARQ feedback, the UE may switch back to the initial UL BWP for initial access or an SI request.

When the connected UE activates an MBMS DL BWP in all of the above-described steps, the connected UE may deactivate a current active DL BWP, receive the current active DL BWP (e.g. BWP1) and MBMS DL BWP (e.g. BWP2) simultaneously, or receive the active DL BWP and MBMS DL BWP at different times. For example, the UE may periodically switch to the MBMS DL BWP according to an MSS set configuration for a specific MCCH or a specific MTCH. After monitoring a PDCCH occasion, the UE may switch to an active DL BWP, default DL BWP, or first active DL BWP for unicast scheduling, unicast transmission/reception, or cell measurement.

When the connected UE activates an MBMS UL BWP in all of the above-described steps, the connected UE may deactivate an active UL BWP, transmit the active UL BWP and MBMS UL BWP simultaneously, or transmit the active UL BWP and MBMS UL BWP at different times. For example, the UE may switch to the MBMS UL BWP to transmit HARQ feedback. After PUCCH HARQ-ACK transmission or PUCCH HARQ feedback transmission for an SIB/MCCH/MTCH TB or after completion of a RACH procedure for HARQ feedback, the UE may switch to an active UL BWP, default UL BWP or first active UL BWP for unicast UL transmission.

According to one embodiment of the present disclosure, the NR system may configure a search space set for the MBMS in the initial BWP or active BWP of the UE and allow monitoring of a PDCCH based on a specific RNTI for the MBMS, thereby quickly receiving MBMS services while saving power depending on the capability of the UE.

Figure 11:
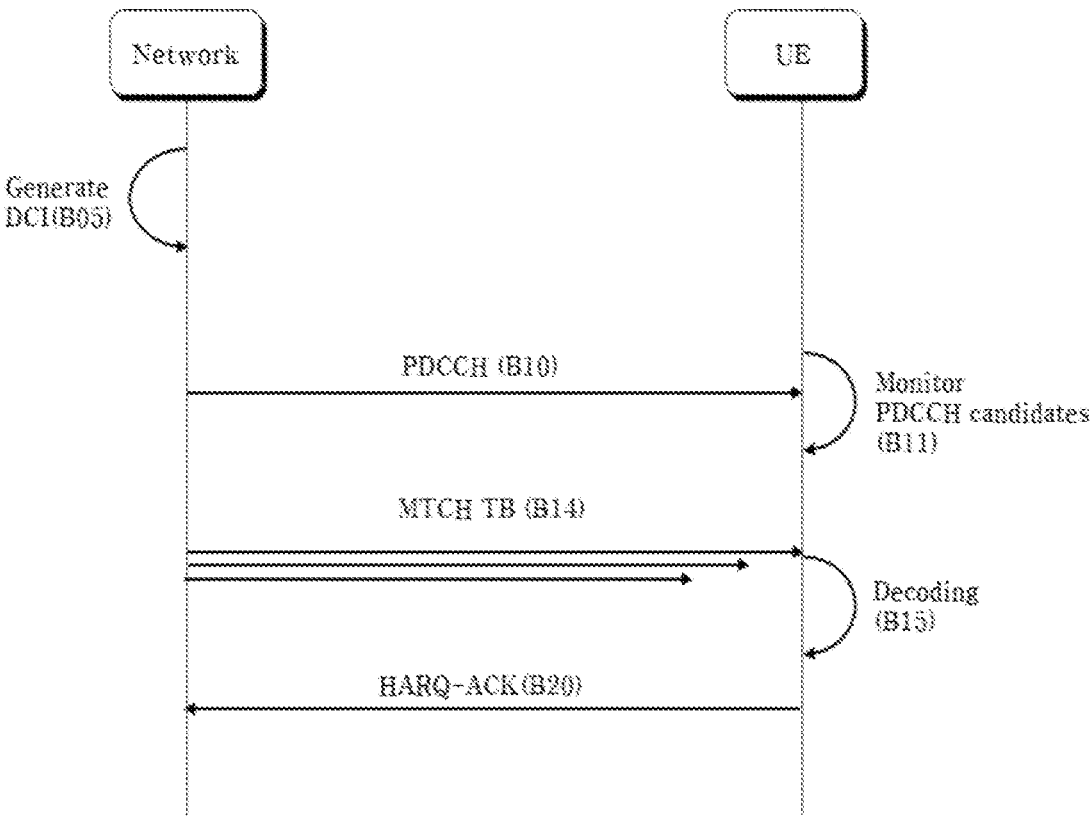
FIG. 11 illustrates a signal transmission/reception method according to an embodiment of the present disclosure.

FIG. 11 illustrates a signal transmission/reception method according to an embodiment of the present disclosure.

Referring to FIG. 11, the BS may generate DCI having a CRC scrambled with a specific RNTI (B05).

The BS may transmit a PDCCH carrying the DCI in a search space for a specific multicast service that the UE desires to receive (B10). The UE may monitor the PDCCH in the search space for the specific multicast service that the UE desires to receive (B11). As a result of monitoring the PDDCH, the UE may receive the DCI having the CRC scrambled with the specific RNTI.

The BS may repeatedly transmit a TB related to the specific multicast service in a multicast frequency part based on the DCI (B14).

After the repetition of the TB, the UE may transmit a HARQ-ACK indicating a decoding result of the TB on a PUCCH resource indicated by the DCI (B20). The BS may receive the HARQ-ACK indicating the decoding result of the TB by the UE on the PUCCH resource indicated by the DCI after the repetition of the TB.

The specific RNTI may be a G-RNTI associated with the specific multicast service that the UE desires to receive.

The DCI may include at least one of information on the number of times that the TB is repeated or information on the multicast frequency part.

The search space may be located in an active frequency part of the UE.

The active frequency part of the UE may be different from the multicast frequency part.

After completing the repetition of the TB in the multicast frequency part, the UE may be configured to return to the active frequency part of the UE and transmit the HARQ-ACK.

The search space may be associated with a service ID of the specific multicast service that the UE desires to receive.

The search space may be selected based on a service ID of the specific multicast service that the UE desires to receive from among a plurality of search spaces.

The TB may be a TB on a traffic channel for the specific multicast service.

When the UE fails to decode the TB even after repeating the TB by the number of times indicated by the DCI, the UE may be configured to the HARQ-ACK to a NACK.

Various descriptions, functions, procedures, proposals, methods, and/or operational flow charts of the present disclosure may be applied to, but not limited to, various fields requiring wireless communication/connection (e.g., 5G) between devices.

With reference to the drawings, the present disclosure will be described in greater detail. In the following drawings/description, like reference numerals may denote the same or corresponding hardware blocks, software blocks, or functional blocks, unless otherwise specified.

Figure 12:
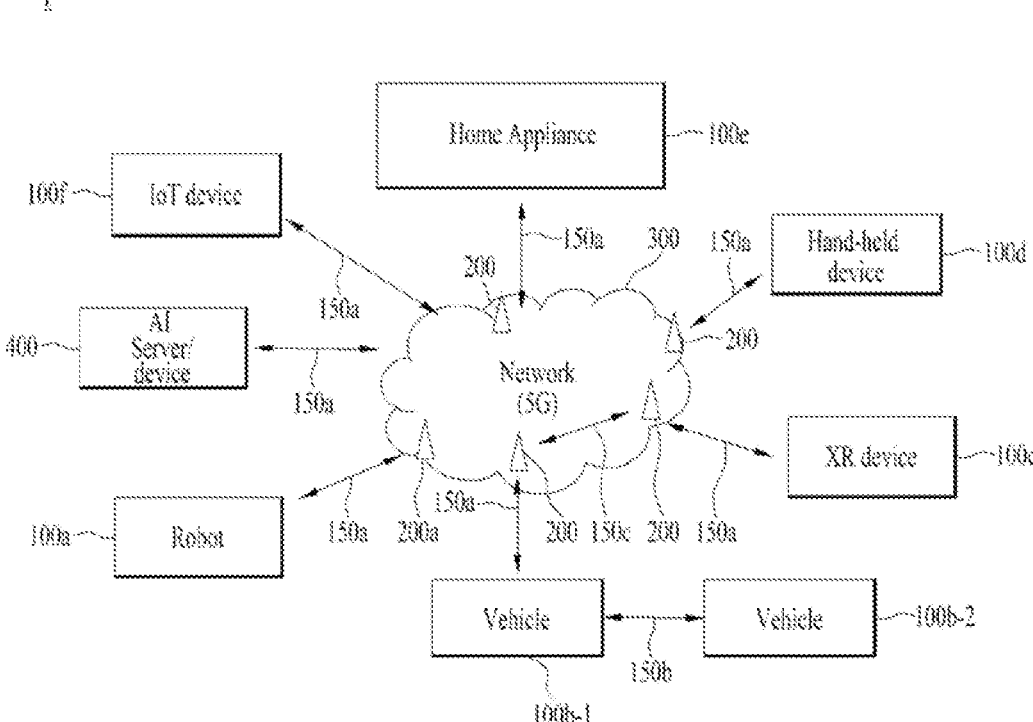
FIGS. 12 to 15 illustrate a communication system 1 and a wireless device applicable to the present disclosure.

FIG. 12 illustrates a communication system 1 applied to the present disclosure.

Referring to FIG. 12, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 13:
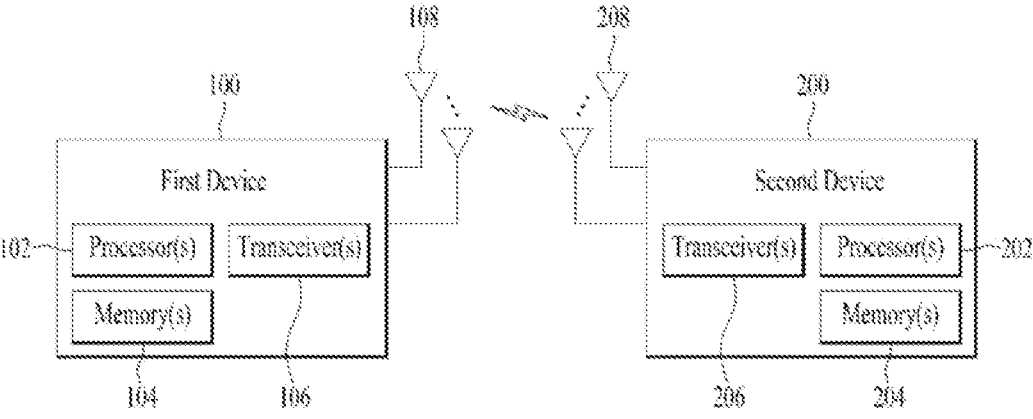

FIG. 13 illustrates wireless devices applicable to the present disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor (s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 14:
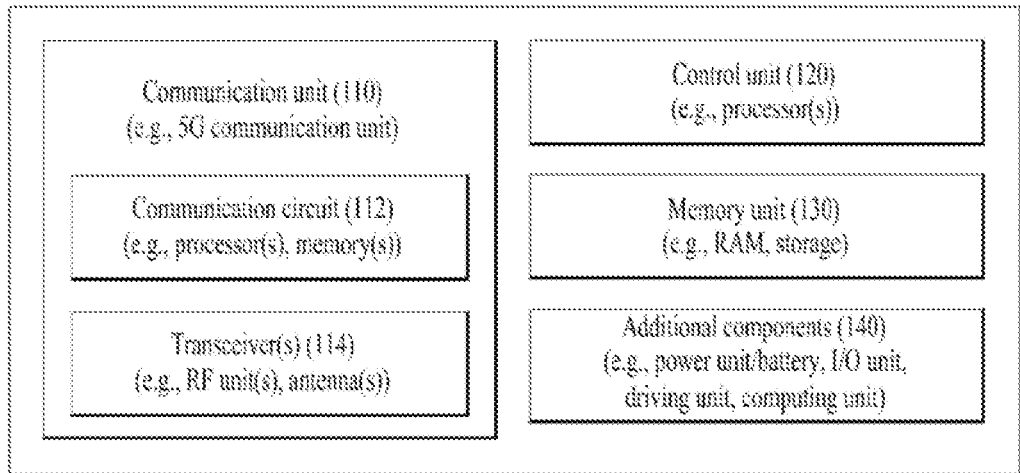

FIG. 14 illustrates another example of a wireless device applied to the present disclosure. The wireless device may be implemented in various forms according to a use-case/service (refer to FIG. 12).

Referring to FIG. 14, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 14, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 15:
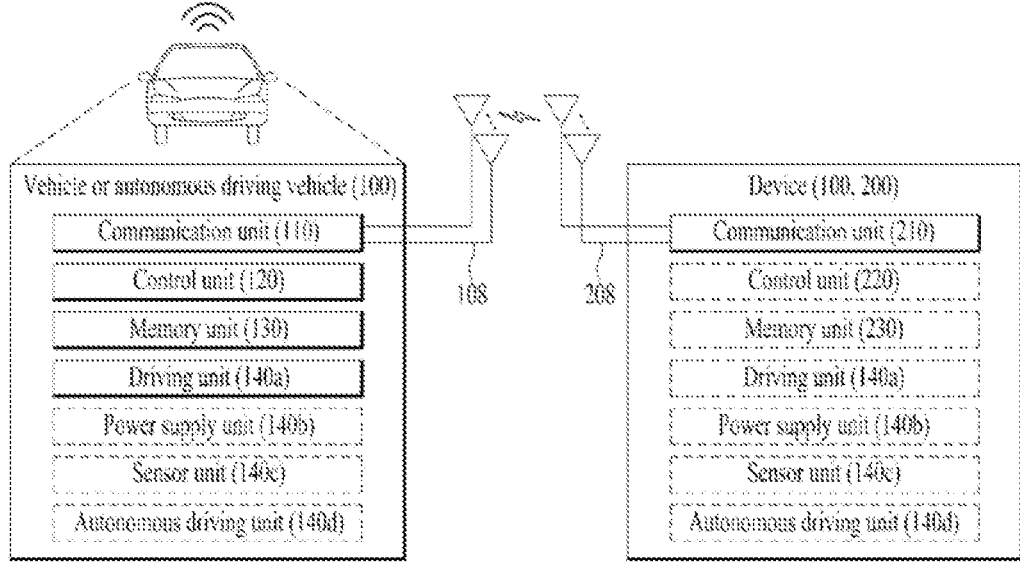

FIG. 15 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 15, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 14, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 16:
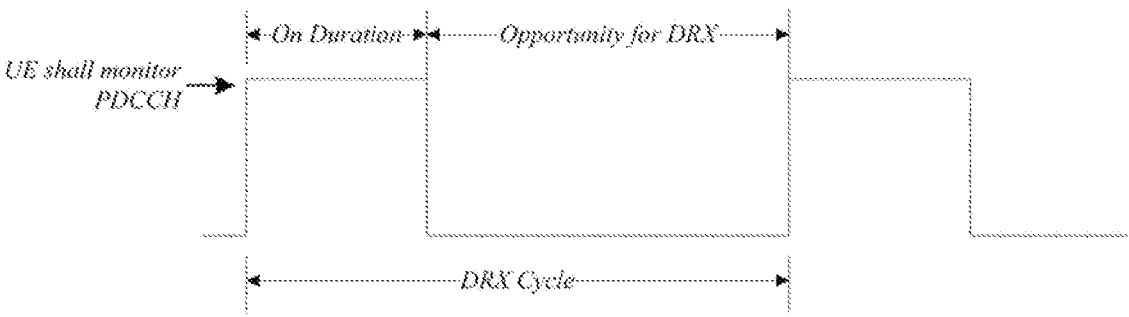
FIG. 16 illustrates a discontinuous reception (DRX) operation applicable to the present disclosure.

FIG. 16 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 16, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration.

Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 6 describes a DRX operation of a UE (in the RRC_CONNECTED state). Referring to Table 6, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 5.

TABLE 6

| | Type of signals | UE procedure |
|---|---|---|
| 1$^{st}$ step | RRC signalling (MAC-CellGroupConfig) | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

The invention claimed is:

1. A method comprising:

monitoring, by a user equipment (UE), a physical downlink control channel (PDCCH) in a search space;

receiving, by the UE, downlink control information (DCI) having a cyclic redundancy check (CRC) scrambled with a group-radio network temporary identifier (G-RNTI) as a result of monitoring the PDCCH;

repeatedly receiving, by the UE, a transport block (TB) for a multicast broadcast service (MBS) in a multicast bandwidth part (BWP) based on the DCI; and transmitting, by the UE, a hybrid automatic repeat request acknowledgement (HARQ-ACK) for the TB based on a physical uplink control channel (PUCCH) resource indicator in the DCI, wherein, based on that a last repetition of the TB is successfully received in the UE, the UE: runs a timer and switches an active BWP from the multicast BWP to a first BWP based on the timer.

2. The method of claim 1, wherein the DCI includes information regarding a TB repetition number and information regarding the multicast BWP.

3. The method of claim 1, wherein the search space is located in the multicast BWP of the UE.

4. The method of claim 3, wherein the first BWP is different from the multicast BWP.

5. The method of claim 4, wherein the HARQ-ACK is transmitted before switching the active BWP.

6. The method of claim 1, wherein the search space is associated with an MBS identifier (ID).

7. The method of claim 1, wherein the search space is selected based on an MBS identifier (ID) from among a plurality of search spaces.

8. The method of claim 1, wherein the TB is related to an MBS traffic channel (MTCH).

9. The method of claim 1, wherein based on a failure of decoding the TB, the HARQ-ACK is set to a negative acknowledgement (NACK).

10. A non-transitory computer-readable storage medium having stored thereon a program for executing the method of claim 1.

11. A user equipment (UE) comprising:

a transceiver; and a processor configured to control the transceiver to:

monitor a physical downlink control channel (PDCCH) in a search space;

receive downlink control information (DCI) having a cyclic redundancy check (CRC) scrambled with a group radio network temporary identifier (G-RNTI) as a result of monitoring the PDCCH;

repeatedly receive a transport block (TB) for a multicast broadcast service (MBS) in a multicast bandwidth part (BWP) based on the DCI; and transmit a hybrid automatic repeat request acknowledgement (HARQ-ACK) for the TB based on a physical uplink control channel (PUCCH) resource indicator in the DCI, wherein, based on that a last repetition of the TB is successfully received in the UE, the UE: runs a timer and switches an active BWP from the multicast BWP to a first BWP based on the timer.

12. A base station comprising:

a transceiver; and a processor configured to:

generate downlink control information (DCI) having a cyclic redundancy check (CRC) scrambled with a group radio network temporary identifier (G-RNTI);

transmit, to a user equipment (UE) through the transceiver, a physical downlink control channel (PDCCH) carrying the DCI in a search space;

repeatedly transmit, to the UE through the transceiver, a transport block (TB) for a multicast broadcast service (MBS) in a multicast bandwidth part (BWP) based on the DCI; and receive, from the UE through the transceiver, a hybrid automatic repeat request acknowledgement (HARQ-ACK) for the TB based on a physical uplink control channel (PUCCH) resource indicator in the DCI, wherein, based on that a last repetition of the TB is successfully transmitted to the UE: the BS runs a timer and, an active BWP for the UE is switched from the multicast BWP to a first BWP based on the timer.

* * * * *